United States Patent
Hsu

(10) Patent No.: US 8,660,093 B2
(45) Date of Patent: Feb. 25, 2014

(54) APPARATUS, METHOD, AND TANGIBLE MACHINE-READABLE MEDIUM THEREOF FOR CALLBACK HANDOVER PROCEDURE IN A FEMTO-NETWORK

(75) Inventor: Hsien-Tsung Hsu, Taipei (TW)

(73) Assignee: Broadband Wireless Technology Corp., Hsi-Chih (TW)

( * ) Notice: Subject to any disclaimer, the term of this patent is extended or adjusted under 35 U.S.C. 154(b) by 0 days.

(21) Appl. No.: 13/596,272

(22) Filed: Aug. 28, 2012

(65) Prior Publication Data

US 2012/0322451 A1  Dec. 20, 2012

Related U.S. Application Data

(62) Division of application No. 12/608,449, filed on Oct. 29, 2009.

(60) Provisional application No. 61/110,555, filed on Nov. 1, 2008.

(51) Int. Cl.
*H04W 4/00* (2009.01)

(52) U.S. Cl.
USPC ............ 370/332; 370/338; 370/341; 370/348

(58) Field of Classification Search
USPC .......... 370/252, 338, 332, 341, 348; 455/403, 455/411, 436
See application file for complete search history.

(56) References Cited

U.S. PATENT DOCUMENTS

| | | | | |
|---|---|---|---|---|
| 2007/0254620 A1* | 11/2007 | Lindqvist et al. | ............. | 455/403 |
| 2009/0047931 A1* | 2/2009 | Nanda et al. | .................. | 455/411 |
| 2009/0061873 A1* | 3/2009 | Bao et al. | ........................ | 455/436 |
| 2009/0196266 A1* | 8/2009 | Wu et al. | ........................ | 370/338 |
| 2010/0027431 A1* | 2/2010 | Morrison et al. | ............. | 370/252 |

* cited by examiner

*Primary Examiner* — Brian D Nguyen
*Assistant Examiner* — Toan Nguyen
(74) *Attorney, Agent, or Firm* — Morris Manning & Martin LLP; Tim Tingkang Xia, Esq.

(57) ABSTRACT

An apparatus, a signaling method, and a tangible machine-readable medium thereof for callback handover procedure in a femto-network are provided, wherein the femto-network comprising a plurality of femto base stations. The apparatus comprises a storage module, a receiving module, a transmission module, and a determination module. The storage module is configured to store and restore information of the femto BS, the information indicating a relation between the apparatus and the related stations. The receiving module is configured to receive the inbound handover signals and outbound handover signals. The transmission module is configured to transmit the inbound handover signals and outbound handover signals. The determination module is configured to determine whether generating inbound handover signals or outbound handover signals.

3 Claims, 4 Drawing Sheets

APPARATUS, METHOD, AND TANGIBLE MACHINE-READABLE MEDIUM THEREOF FOR CALLBACK HANDOVER PROCEDURE IN A FEMTO-NETWORK

CROSS-REFERENCE TO RELATED APPLICATIONS

This non-provisional application is a divisional application of U.S. patent application Ser. No. 12/608,449, filed Oct. 29, 2009, which itself claims the benefit of U.S. Provisional Application Ser. No. 61/110,555 filed on Nov. 1, 2008, the disclosure of which are incorporated herein by reference in their entirety.

BACKGROUND OF THE INVENTION

1. Field of the Invention

The present invention relates to an apparatus, a signaling method, and a tangible machine-readable medium for callback handover procedure for network composed of outdoor base station (BS), outdoor relay, indoor base station (Femto BS) and indoor relay; more specifically, relates to an apparatus, a signaling method, and a tangible machine-readable medium for callback handover procedure for indoor and outdoor base stations and relays under the IEEE 802.16m and LTE/LTE-A standards.

2. Descriptions of the Related Art

Although the IEEE 802.16 and LTE/LTE-A standards already provide greater bandwidths, lower building cost, better service quality and expansibility, there still are some defects of coverage and signal quality of the IEEE 802.16 and LTE/LTE-A standards. Therefore, the IEEE 802.16/LTE/LTE-A standard working groups have included the indoor femto base stations (BSs). The major difference between an indoor femto BS and an outdoor BS is the media type of backhaul link. Femto BS uses the wired link, such as ADSL and Cable link, as the backhaul link.

Please refer to FIG. 1, which illustrates the cellular network topology, which comprises an mobile station (MS), an outdoor base station (BS), an indoor femto BS, a backbone network and a network mobility controller, wherein the MS is one type of subscriber station (SS) which has mobility. The MS intends to access the backbone network via the outdoor BS and/or indoor femto BS. The considered scenario is that the type of backhaul link of femto BS is wired link and the femto BS can communicate with the other BSs and network mobility controller via backbone network. It can be understood that, a femto BS will disable its air interface unless the backhaul connection with the backbone network is fully established.

The handover procedure adopted in the IEEE 802.16e/LTE/LTE-A standards, is a technique, which allows an MS to change the associated BS when the channel condition is unsatisfactory. That is, such conventional handover procedure is designed to force an MS to disassociate with its serving BS according to the metrics of signal quality, network load, and so on. Since the backhaul link of femto BS may disconnect/reconnect from/to backbone network sometimes, the femto BS will command all the associated MSs to handover to the other BS when it disconnects from backbone network. There are two main defects in conventional handover mechanism. First, there is no out-bound handover reason provided to the MS. The MS then cannot distinguish that the handover signal is triggered by bad channel quality, disconnection of backhaul link or the other reasons. So the MS may not record the information of the femto BS, which issues the out-bound handover signal. Second, there is no in-bound handover reason provided to the MS, the MS cannot distinguish that handover signal is triggered by bad channel quality, recovery of backhaul link or the other reasons. The MS may take a long time to handover to the previously serving femto BS which provides a good channel quality. Accordingly, how to improve the performance of the out-bound and in-bound handover in femto-networks is still an objective for the industry to endeavor.

Since the backhaul link of femto BS may disconnect/reconnect from/to backbone network sometimes, the method for fast handling the associated MSs to leave from and return to the femto BS should be supported in order to continue the services and optimize the network performance. As the serving femto BS loses the backhaul connection, the femto BS shall disable its downlink air interface transmitter until the backhaul connection with the backbone network is fully recovered. Accordingly, a femto BS should be able to command all the associated MSs to perform out-bound and in-bound handover procedures in order to continue services. The out-bound handover signal includes the reason code, which is used to notify the MSs about the discontinuous services of serving femto BS and thereby the MSs record the information of serving femto BS and then handover to the other BSs. As the femto BS reconnects to the backbone network, the femto BS and/or the network mobility controller issues in-bound callback handover signal with reason code to neighboring femto BSs and outdoor BS to call back those MSs, who left from the previously serving femto BS. Upon receiving the in-bound callback handover signal with specific reason code from either femto BS or outdoor BS, the MS will try to conduct optimized handover to the previously serving femto BS if the signal quality is better than the current connection. In a word, the primary objective of this invention is to provide a signaling method for bi-directional handover with reason code in a femto-network.

SUMMARY OF THE INVENTION

The primary objective of this invention is to provide a signaling method for supporting callback handover procedure in a femto-network. The method comprises the steps of: femto BS transmitting the out-bound handover signal to associated MSs when it loses the backhaul connection; MS receiving the out-bound handover signal; MS decoding the out-bound handover reason; MS recording the information of current femto BS according to the out-bound handover reason, femto BS issuing the in-bound handover signal to correspondent network mobility controller, outdoor BS and femto BSs when it recovers the backhaul connection and is ready for service; the notified network controller and BSs transmitting the in-bound (i.e. call-back) handover signal to correspondent MSs; MS receiving the in-bound handover signal, MS decoding the in-bound handover reason and retrieving the recorded BS information; and MS handing over to the previously serving femto BS if the channel quality is better than the current one.

The method of driving associated MSs handover to another BS is initiated by the femto BS which discontinues service. The method of calling back those ever associated MSs is initiated by the same femto BS and/or network mobility controller. In order to ensure that MSs can re-associate with previously serving femto BS, the handover control signals shall carry necessary information, such as the reason code for the handover request, the operational channel, BS identity information of the requesting femto BS, and so on. The considered scenario is that the backhaul connection of femto BS may be temporarily disconnected from network by some reasons and the backhaul connection may reconnect to network later. An MS associating to femto BS is commanded to leave and return the femto BS according to the status of backhaul connection.

Another object of this invention is to provide an apparatus for femto BS to detect the connectivity of backhaul connection and issue the out-bound handover signal and in-bound handover signal. The apparatus comprises a determination module, a receiving module and a transmission module. The determination module is configured to determine that the backhaul connection is connected or disconnected. The receiving module is configured to receive the in-bound handover signal from the other BSs or network mobility controller. The transmission module is configured to transmit the out-bound handover signal to MSs according to the determination result.

Yet a further objective of this invention is to provide an apparatus for MS to execute out-bound handover and in-bound handover according to the handover signal in femto-networks. The apparatus comprises a receiving module, a determination module, and a storage module. The receiving module is configured to receive the out-bound handover signal and in-bound handover signal. The determination module is configured to determine that the reasons in the out-bound handover signal and in-bound handover signal. The storage module is configured to store the information of femto BS in the femto-network according to the reason.

Yet a further objective of this invention is to provide a tangible machine-readable medium storing a computer program for femto BS to enable an apparatus to execute a signaling method for issuing the out-bound or in-bound handover signal at femto BS. The signaling method comprising the steps of: enabling the apparatus to determine the status of backhaul connection; enabling the apparatus to transmit the out-bound handover signal to MS according to the status of backhaul connection, the status indicating the connectivity of the backhaul connection; and enabling the apparatus to receive the in-bound handover signal from BS or network mobility controller.

Yet a further objective of this invention is to provide a tangible machine-readable medium storing a computer program for MS to enable an apparatus to execute out-bound handover and in-bound handovers in the femto-network. The signaling method comprising the steps of: enabling the apparatus to receive the out-bound handover signal; enabling the apparatus to determine the reason code; and enabling the apparatus to store the information of femto BS according to the result in out-bound handover signal and in-bound handover signal.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides an apparatus, a signaling method, and a tangible machine-readable medium thereof for callback handover procedure in a femto-network. In the following embodiments, femto-networks based on the IEEE 802.16e standard are used. However, the scope of the present invention is not limited to the applications based on the IEEE 802.16e standard. The handover operations in a network based on the IEEE 802.16e standard are well-known by people skilled in the art, and are not repeated again. A femto-network has two kinds of handover operations: outbound and inbound handover operations. In this invention, both the outbound and inbound handover operations in the femto-network are described. It means that the handover operations relating to transmitting a handover signal from the old femtoBS and the new femtoBS to a mobile station are described.

Figure 1:
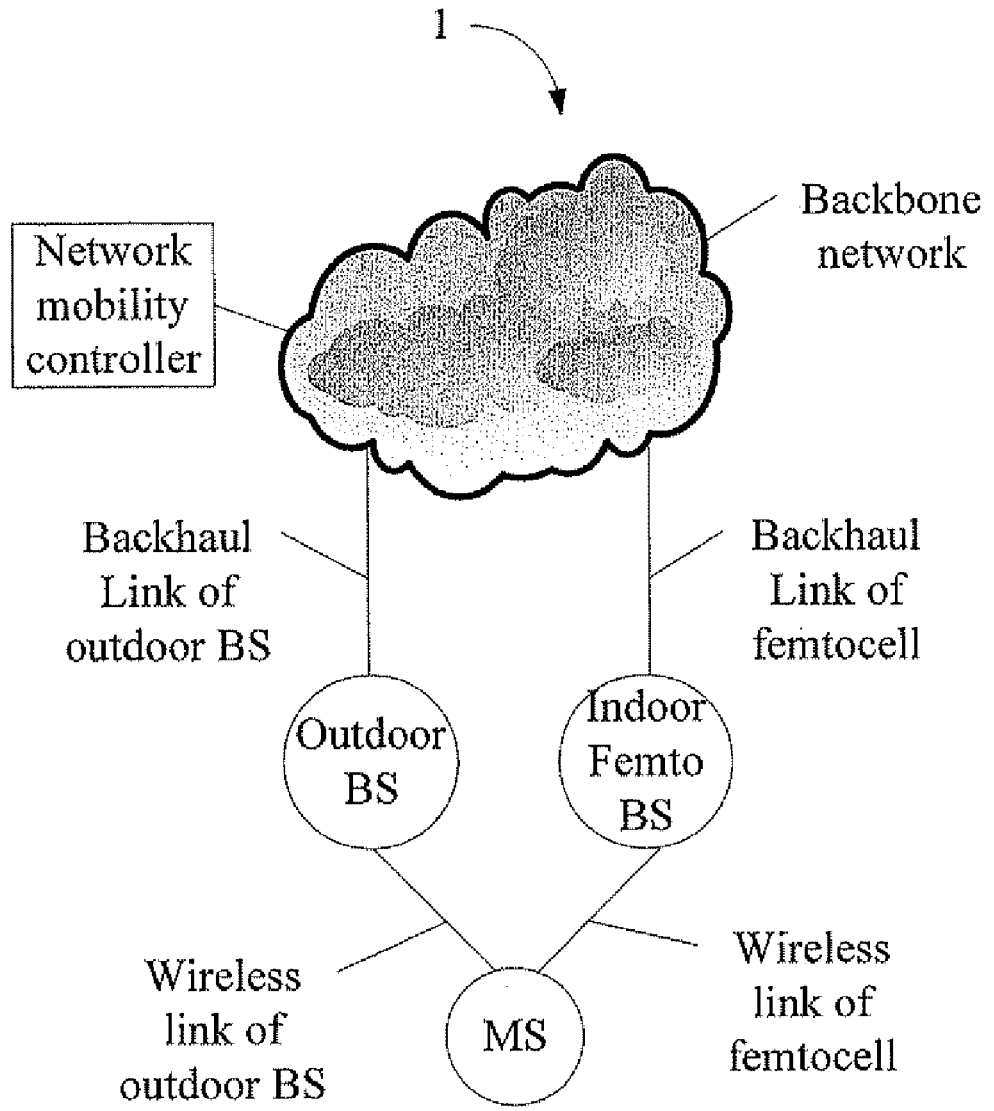
FIG. 1 illustrates a typical cellular network topology which composes of an MS, an outdoor BS, an indoor femto BS, a backbone network and a network mobility controller.
Figure 2:
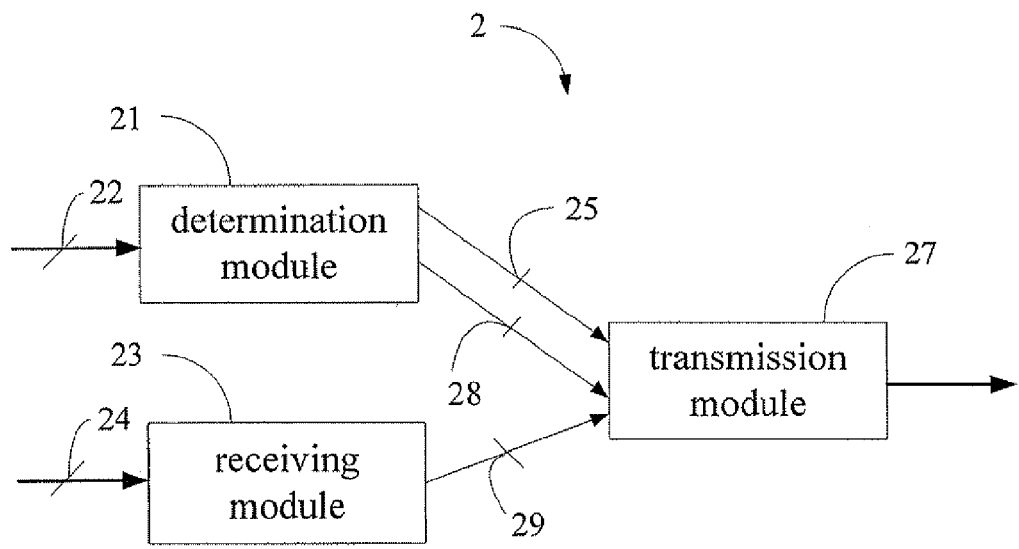
FIG. 2 is a schematic diagram of the first embodiment of the present invention.

A first embodiment of the present invention is shown in FIG. 2, which shows an apparatus 2 for generating an out-bound handover signal 25 or inbound handover signal 24 from a femto BS to an MS in a femto-network. The apparatus 2 serves as a femto BS in the femto-network. The apparatus 2 comprises a determination module 21, a receiving module 23, and a transmission module 27. The determination module 21 is configured to determine the connectivity status of backhaul link 22 of the femto BS. The determination module 21 can determine whether the status of backhaul link 22 is connected or disconnected. If the detection module detects that the status switches from connected state to disconnected state, it generates an outbound handover signal 25 intended to be transmitted by the transmission module 27 to the associated MS(s). On the other hand, if the determination module detects that the status switches from disconnected state to connected state, it generates the inbound handover signal 28 intended to be transmitted by the transmission module 27 to the other femto BS(s) and network mobility controller. The receiving module 23 is configured to receive the inbound handover signal 24 sent from the other femtoBS or network mobility controller. The inbound handover signal 29 which carries the information in the inbound handover signal 24 will be sent to the transmission module 27 so that the transmission module can transmit inbound handover signal 29 to correspondent MS(s).

The transmission module 27 is then configured to retrieve the inbound handover signal 24 from the determination module 21 and the receiving module 23 and then transmit the inbound handover signal to the MS(s) and the other femto BS(s)/network mobility controller, respectively. The transmission module 27 is also configured to retrieve the outbound handover signal 25 from the determination module 21 and then transmit the outbound handover signal to the associated MS(s).

The femto-network may comprise other femtoBSs, and the transmission module 27 of the apparatus 2 can know its neighboring femto BSs and/or network mobility controller.

So, the transmission module 27 of the apparatus 2 transmits the inbound handover signal 24 and the outbound handover signal 25 to correspondent stations.

All the mentioned inbound handover signal and outbound handover signal are associated with the reason code, which describes the reason of handover event.

Figure 3:
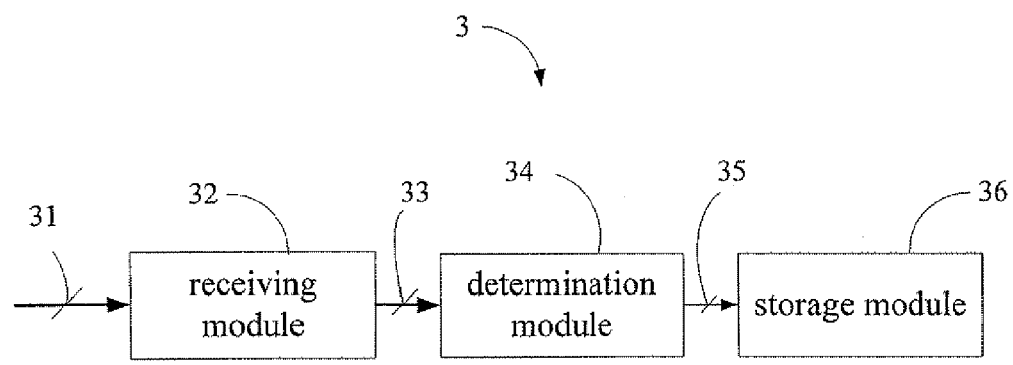
FIG. 3 is a schematic diagram of the second embodiment of the present invention.

A second embodiment of the present invention is shown in FIG. 3, which shows an apparatus 3 for receiving a handover signal 31 from a femto BS and execute the handover procedure in a femto-network. The apparatus 2 serves as an MS in the femto-network. The apparatus 2 comprises a receiving module 32, a determination module 34, and a storage module 36. The receiving module 32 is configured to receive a handover signal 31 sent from the serving BS. The internal signal 33 carries the information in the received handover signal 31 and is sent to the determination module 34 so that the determination module 34 can determine whether the handover signal is outbound handover signal or inbound handover signal. In addition, the determination module 34 also determines the reason of handover event.

If the detection module 33 detects that the received handover signal 32 is an outbound handover signal and the associated reason of handover event is the failure of femto BS such as disconnection of backhaul link, it stores the information of current femto BS 34 into the storage module 35 and then executes the conventional handover procedure. On the other hand, if the determination module 33 detects that the received handover signal 32 is an inbound handover signal and the associated reason of handover event is the recovery of femto BS, which is in the femto BS list, then it restores the information of previous femto BS from the storage module 35 and then executes the conventional handover procedure to evaluate the channel quality.

Figure 4:
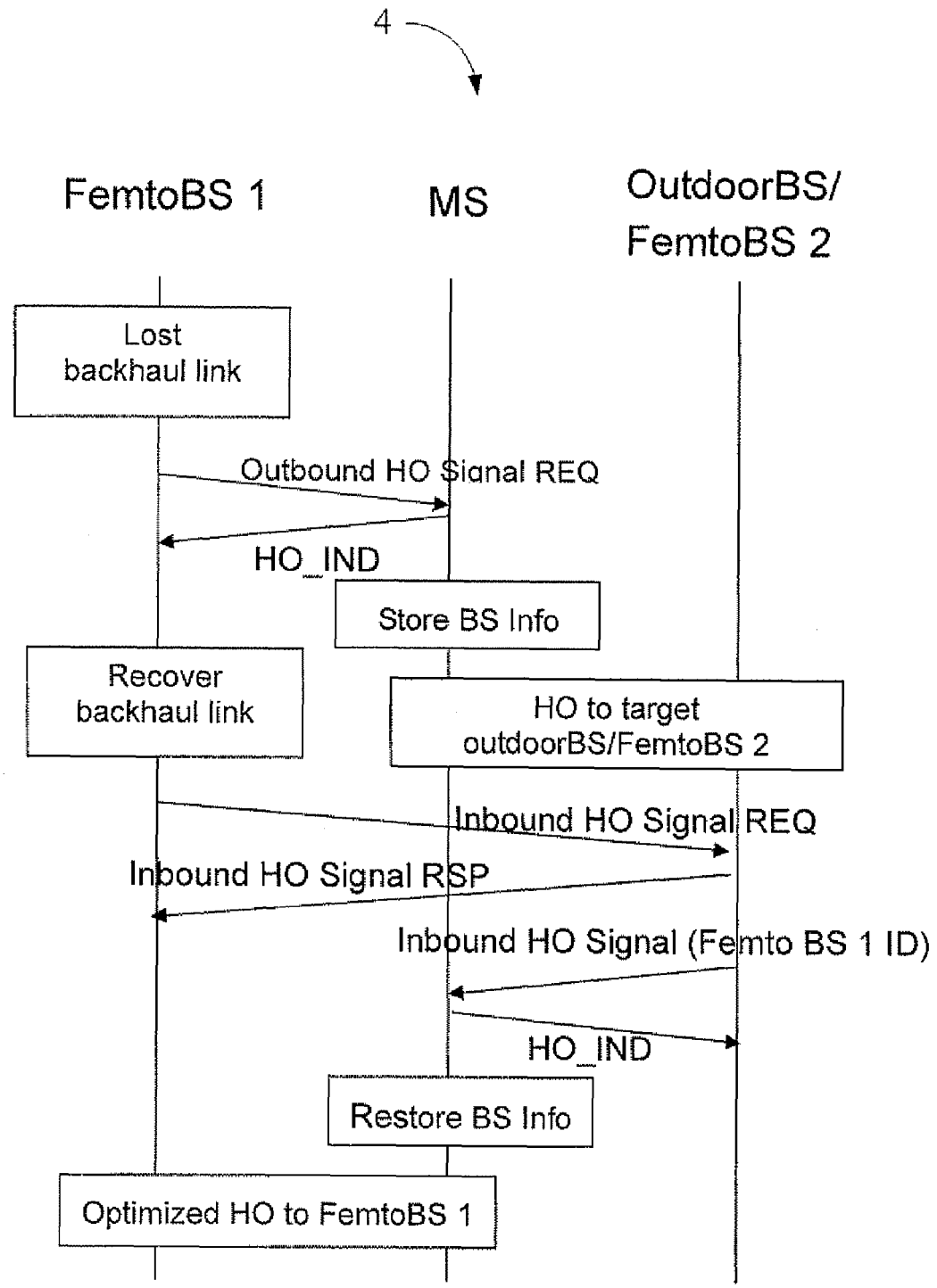
FIG. 4 is a schematic diagram of a concrete example that the femto BS commands associated MS(s) to perform out-bound handover to the other BS(s) when it loses the backhaul connection and to perform in-bound (callback) handover to it when it recovers the backhaul connection.
Figure 5:
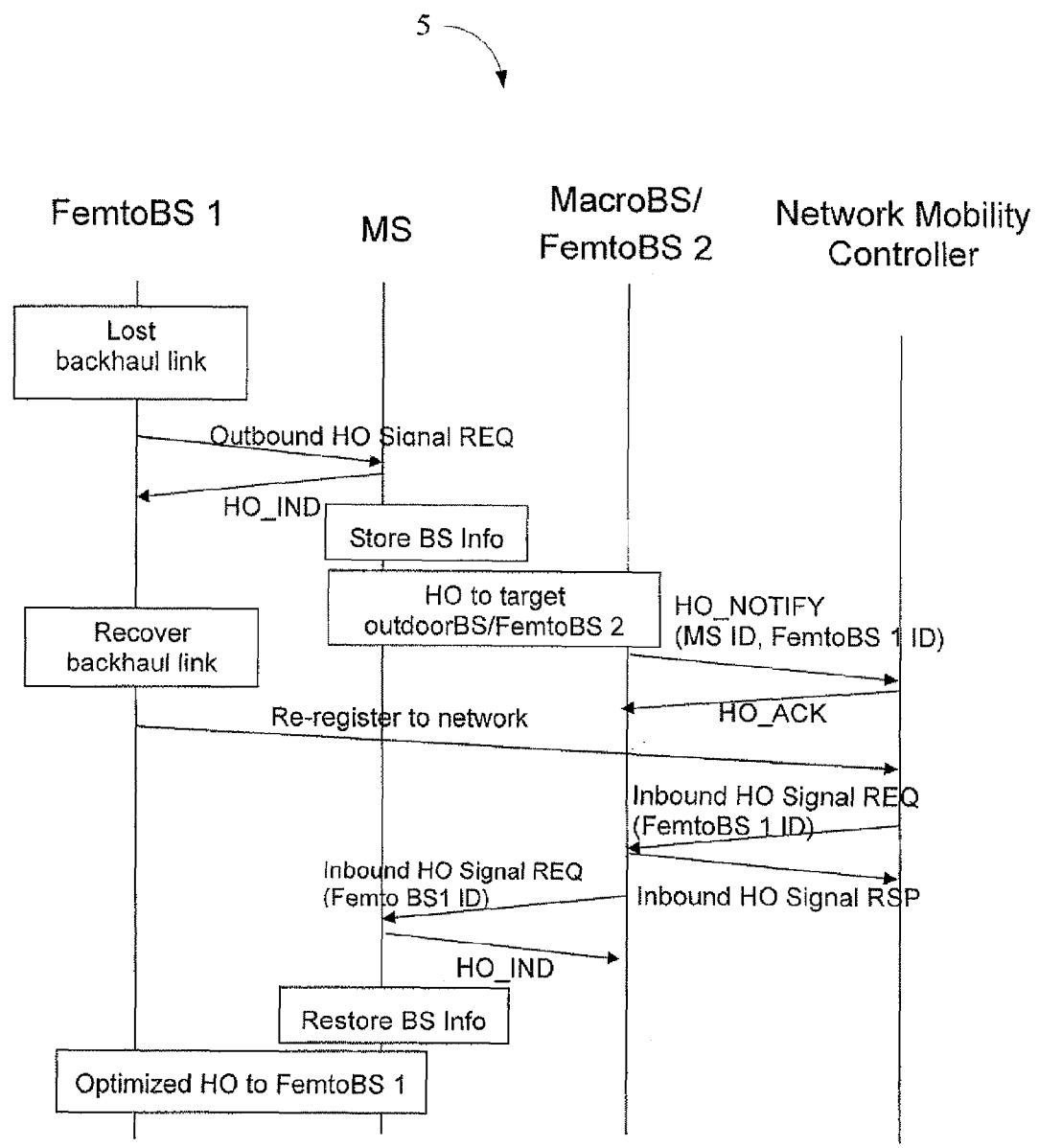
FIG. 5 is a schematic diagram of a concrete example that femto BS commands associated MS(s) to perform out-bound handover to the other BS(s) when it loses the backhaul connection and after then it triggers the network mobility controller to command MS(s) to perform in-bound (callback) handover back to it after it recovers the backhaul connection.

As mentioned, the apparatuses 2 and 3 are a femto BS and an MS in a femto-network respectively. Please refer to FIG. 4 and FIG. 5 for two concrete examples, which respectively show the outbound and inbound handovers in femto-system 4 without the network mobility controller and in femto-system 5 with the network mobility controller. The femto-system 4 comprises an MS, and two femto BSs (Femto BS 1 and Femto BS 2) or outdoor BS, wherein each of the femto BS are the apparatus 3 of this embodiment. In FIG. 4 and FIG. 5, the vertical axes indicate the time, Outbound HO Signal indicates the outbound handover signal that is generated by the failure of Femto BS 1, Inbound HO Signal indicates the inbound handover signal that is transmitted by Femto BS 2 due to the recovery of Femto BS 1, and HO_IND indicates the confirmed signal sent from MS to serving BS to notify the successfully handover to another BS.

In FIG. 4, the Outbound HO Signal is transmitted from the Femto BS 1 to the MS due to failure of Femto BS 1. When the MS receives an Outbound HO Signal, it stores the information for Femto BS 1 and handovers to Femto BS 2. The HO_IND is transmitted from MS to Femto BS1 to complete the handover procedure. Then, the Femto BS 1 successfully recovers the service again, and it notifies the Femto BS 2 (and outdoor BS) to execute the callback process via sending inbound handover signal. The Femto BS 2 then transmits Inbound HO Signal to MS with the identity of recovered Femto BS 1, and then MS restores the information of Femto BS 1 and executes the handover procedure. The MS handovers to Femto BS 1 and transmits the HO_IND to the Femto BS 2 to complete the handover procedure.

In FIG. 5, the Outbound HO Signal is transmitted from the Femto BS 1 to the MS due to failure of Femto BS 1. When the MS receives an Outbound HO Signal, it stores the information for Femto BS 1 and handovers to Femto BS 2. The HO_IND is transmitted from MS to Femto BS1 to complete the handover procedure. Then, the Femto BS 2 notifies the network mobility controller about the handover event of MS. When the Femto BS 1 successfully recovers the service again, it notifies the network mobility controller to execute the callback process. The network mobility controller transmits the inbound handover signal to Femto BS 2. Femto BS 2 then transmits Inbound HO Signal to MS with the identity of recovered Femto BS 1, and then MS restores the information of Femto BS 1 and executes the handover procedure. The MS handovers to Femto BS 1 and transmits the HO_IND to the Femto BS 2 to complete the handover procedure.

From FIG. 4 and FIG. 5, it can be seen that the handover between the Femto BS 1 and Femto BS 2 appears efficient. That is, although the Femto BS 1 temporarily fails to provide service, it can command the associated MS(s) to handover to the other BS and then call back them when the service is recovered.

According to the above configurations, the present invention provides an apparatus to generate appropriate handover signal in accordance with the status of the femto BS. This can effectively distribute MSs to femto BSs, which can provide the better channel quality, to improve the performance of the femto-system.

Each of the aforementioned methods can use a tangible machine-readable medium for storing a computer program to execute the aforementioned steps. The tangible machine-readable medium can be a floppy disk, a hard disk, an optical disc, a flash disk, a tape, a database accessible from a network or a storage medium with the same functionality that can be easily thought by people skilled in the art.

the present invention provides a new approach to handover MS between femto BSs according to the status of femto BSs. This will effectively utilize the bandwidths to improve the performance of the femto-system. The present invention can be utilized in femto-network, such as those based on the IEEE 802.16e standard.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A signaling method for generating outbound handover signal in a femto-network, comprising the following steps executed by a femto BS:
   determining the status of the femto BS;
   determining the reason of the outbound handover signal; and
   transmitting the outbound handover signal including a reason code and information of the femto BS to a mobile station;
   wherein the mobile station stores the information of the femto BS in the outbound handover signal and handovers to another femto BS based on the reason code of the outbound handover signal; and
   wherein the mobile station restores the information of the femto BS and handovers from the another femto BS back to the femto BS after the femto BS transmits an inbound handover signal to the another femto BS.

2. A non-transitory tangible machine-readable medium storing a computer program to enable an apparatus to execute a signaling method for outbound handover in a femto-network, the signaling method comprising the steps of:
   enabling the apparatus to determine that the service of femto BS is discontinuous and the reason code; and
   enabling the apparatus to transmit an outbound handover signal including the reason code and information of the femto BS to MSs according to the disconnection status of the femto BS;
   wherein the MSs store the information of the femto BS in the outbound handover signal and handover to another femto BS based on the reason code of the outbound handover signal; and
   wherein the MSs restore the information for the femto BS and handover from the another femto BS back to the femto BS after the femto BS transmits an inbound handover signal to the another femto BS.

3. A non-transitory tangible machine-readable medium storing a computer program to enable a mobile station to execute outbound handover in a femto-network, the signaling method comprising the steps of:
   enabling the mobile station to receive an outbound handover signal including a reason code and information of a femto BS from the femto BS; and
   enabling the mobile station to store the information of the femto BS and handover to another femto BS based on the reason code of the outbound handover signal;
   wherein the mobile station restores the information for the femto BS and handovers from the another femto BS back to the femto BS after the femto BS transmits an inbound handover signal to the another femto BS.

* * * * *